United States Patent [19]
Bixel, Jr.

[11] Patent Number: 5,746,146
[45] Date of Patent: May 5, 1998

[54] SURFACE EFFECT PLANING PONTOON SEAPLANE (SEPPS)

[76] Inventor: Charles Gilbert Bixel, Jr., 395 Gardner Dr., Fort Walton Beach, Fla. 32548

[21] Appl. No.: 732,714

[22] Filed: Oct. 18, 1996

[51] Int. Cl.$^6$ ........................................... B63B 1/34
[52] U.S. Cl. ........................................ 114/67 A; 180/126
[58] Field of Search ........................ 114/67 R, 67 A; 180/116, 117, 126

[56] References Cited

U.S. PATENT DOCUMENTS

| | | |
|---|---|---|
| 2,322,790 | 6/1943 | Cristadoro ........................... 114/67 A |
| 5,105,898 | 4/1992 | Bixel, Jr. ............................ 180/126 |

Primary Examiner—Jesus D. Sotelo
Attorney, Agent, or Firm—John P. Halvonik

[57] ABSTRACT

A zero draft cargo vessel with high speed open sea operational capabilities, a catamaran type design with hovercraft systems capable of lifting the craft slightly out of the water and air lubricating the planing pontoon bottoms for greatly reduced water drag at all speeds. A surface effect ship (SES, twin hard sidewalls), design with flat bottom planning pontoons, (SEPPS). The soft Hovercraft air pad being contained and stabilized by the twin high speed surface planing pontoon reactions. A high speed cargo vessel capable of operating at two to three times the speeds of conventional cargo vessels having the same horse power to weight ratios. A high speed cargo vessel design of greatly increased fuel efficiency per ton mile due to its greatly reduced water drag. A fast cargo vessel traveling at near three times the speed with the same hourly fuel consumption of large conventional cargo ships. This equates to getting there in $\frac{1}{3}$ the time and $\frac{1}{3}$ the fuel. A zero draft cargo surface effect ship capable of very shallow water operations for cargo load and off load on beaches and shore ramps. The design is adaptable to a multitude of fast military transport ships and fast commercial cargo, container, or refrigerated ships. The SEPPS designs may be applied to any size craft from 25 ft. to over 500 ft. hull length. The SEPPS designs are so much more efficient and safer to operate at high speeds than any other type vessel in operation on the seas today. The design is considered a major break through in marine design. The SEPPS zero draft vessels can open new shallow water shipping lanes, ports and rivers, to commerce in areas not accessible to normal draft cargo ships.

4 Claims, 5 Drawing Sheets

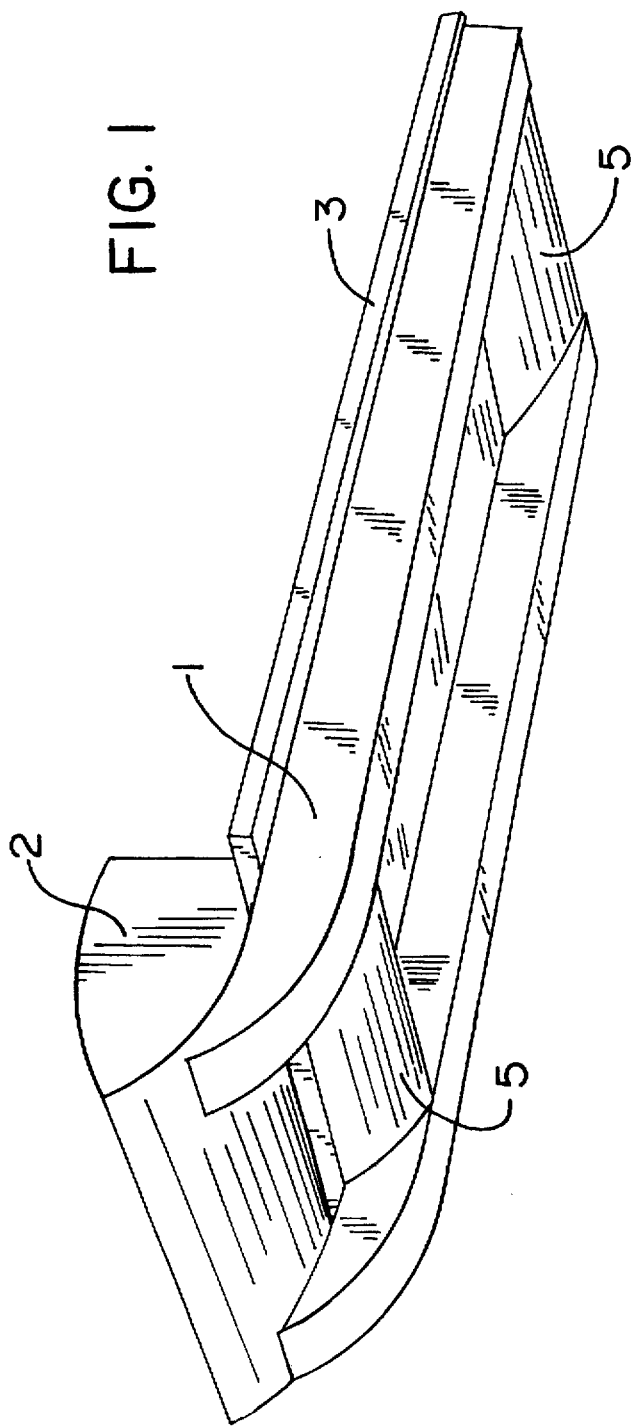

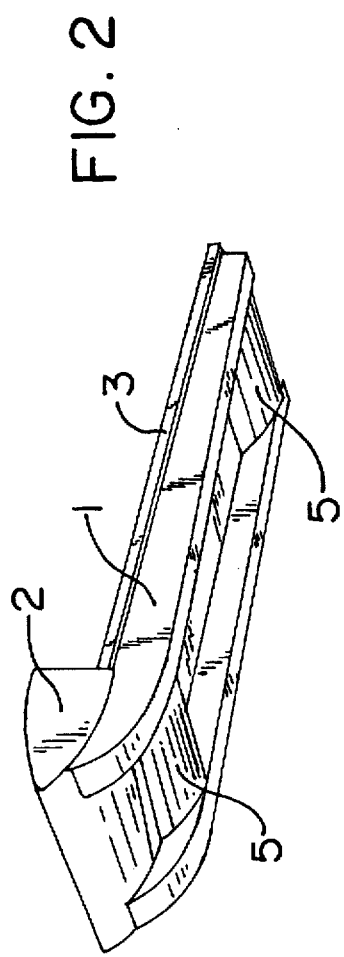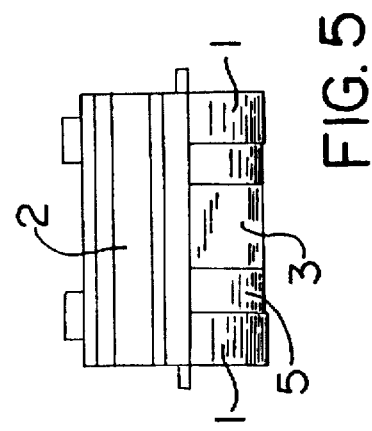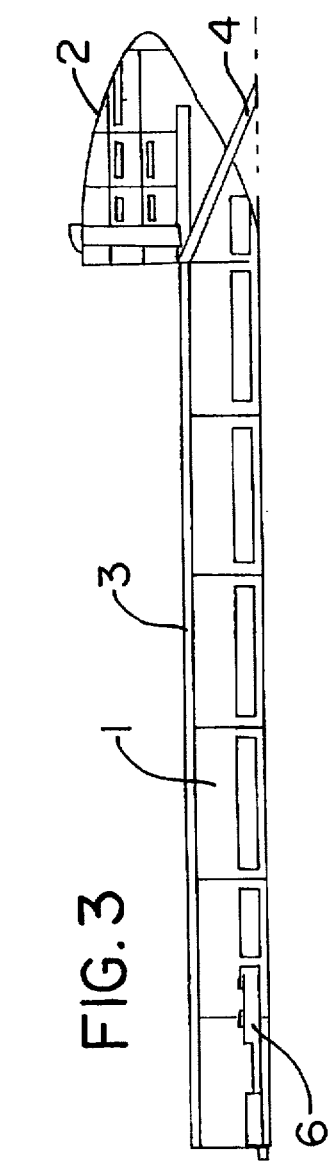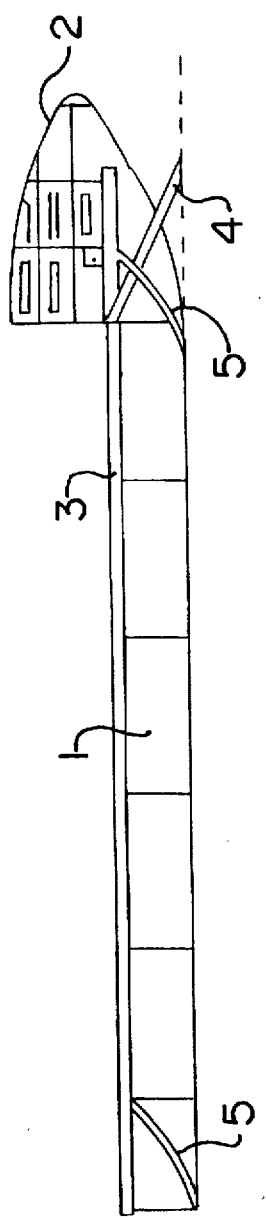

SURFACE EFFECT PLANING PONTOON SEAPLANE (SEPPS)

FIELD AND BACKGROUND OF THE INVENTION

Most large commercial and military hovercraft, (inflated skirt), while providing fast zero-draft water transport, are not fuel efficient nor are they safe to operate at high speeds in high winds and wave conditions. Their prime asset being the capability of moving onto flat beaches to load and off load out of the water. Most large commercial and military hovercraft advertise operational speeds of around 45 knots (kts), with top speeds near 70 kts. The thrust horsepower required to operate the large hovercraft at these speeds, can fly a medium size cargo or passenger aircraft at 350 kts. The thin side wall SES hovercraft (a barge or boat hull with thin side plates extending the length of an well below their hulls), also requires excessive thrust power plus, plus high-tech, auto-pilot controlled hydrofoil systems for open sea pitch and turn stabilization. The wider flotation hull SES catamaran ferry boat size craft all use "V", contoured, and stepped pontoon bottoms that are only partially lifted out of the water for reduced hull drag. Their high speed hull bottoms running below the surface to provide the lateral and longitudinal control required for the soft hovercraft air pad. The skirted hovercraft cannot operate with their hovercraft (HC) lifting engines off or non operational, and the thin wall SES craft without lift power becomes a deep draft barge with both the hull and skegs in the water. The loss of HC lift power at high speeds for both the skirted and SES type Hovercraft is extremely dangerous as they stop abruptly and can dig-in and be damaged or lost. The Navy (LCAC), landing and assault skirted hovercraft require large mother ships with internal loading ramps to service, load, and unload. The LCAC's poor lateral stability on or off cushion makes the loading of heavy units over the side of a cargo ship onto its deck a hazardous operation. Several of these large skirted hovercraft have flipped over attempting to operate in high wind and sea conditions. The excessive power required to operate these craft at high speeds reduces their effective range to short ferry boat operations.

The planning pontoon ses design was initially developed to provide safer and more efficient high speed operational capabilities for large seaplane designs taking off in the open seas. The SEPPS design lifts the flat bottom pontoons slightly out of the water prior to acceleration. The twin flat bottom pontoons use their surface planning reactions to laterally stabilizes the soft hovercraft air pad for safer high speed open water operations. Testing of the SEPPS design was conducted with a 24 ft. twin stepped flat bottom SEEPS prototype flying in ground effect test vehicle, a 27 ft. non stepped flat bottom SEPPS prototype with twin outboard motors, plus radio controlled scale flying models. The tests confirmed the low water drag and superior rough water characteristics of the twin planning pontoon hovercraft design.

The seaplane planning pontoon hovercraft SEPPS stepped pontoon design was changed to make it a straight line, non-stepped, flat bottom, twin hull, ship design. The flat bottom planning pontoon SEPPS designs providing faster and more efficient operations than any other ship, hovercraft, or planning hull craft. The designs greatly reduced water drag characteristics are achieved by lifting the craft slightly out of the water and air lubricating the undersides of the twin flat bottom pontoons. The planning pontoon description is misleading as the planning pontoons surface reactions do not support the ship's weight. The flat bottomed twin pontoons only providing the high speed water ski surface contact reactions sufficient to stabilize and contain the soft hovercraft air-pad. Numerous photographs taken of the test craft at high speeds show the hovercraft air escaping, blow out mist, along the entire length of the pontoons. The pontoon bottoms being lifted slightly out of the water are air lubricated by the escaping hovercraft over pressures greatly reducing the high speed water drag. The hovercraft systems evenly distributed lifting force on the underside of the SEPPS center deck section greatly reduces the catamaran designs deck stresses. The SEPPS twin pontoons have adequate flotation for efficient hovercraft off, normal speed catamaran operations, plus interior space for the thrust engines and their fuel. Placing the engines and consumable fluids in the bottoms of the pontoons greatly lowers the ships center of gravity for safer high speed open sea operations. Most catamaran designs have superior lateral flotation for side loading, off loading, and station keeping at sea.

The SEPPS designs greatly reduced water drag allows higher operational water speeds than conventional skirted or SES hovercraft, and planning hull craft, of equal horse power to weight ratios. The loss of HC power a high speeds for the planning pontoon design is not dangerous. The twin flat bottom pontoons provide a water ski effect allowing the vehicle to decelerate on the surface to minimal speeds before settling into the water to safely and efficiently proceed as a catamaran type craft. Compared with hydro foil craft the SEPPS does not require excessive power to climb out of the water and runs cleanly on the surface with minimal danger from floating and submerged object strikes. The planning pontoon design can safely operate at high water speeds in wave heights up to one and one half times its pontoon depth. The hovercraft lifting action raises the flat bottom pontoons to the water surface allowing the majority of the wave mass to pass below and between its twin pontoons. The hovercraft elevated thin pontoons pierce the wave tops with minimal impact forces for a smooth high speed ride. Research indicates that no other SES design lifts the craft completely to the waters surface, nor uses the water ski planning reactions for stabilizing the soft hovercraft air pad.

SUMMARY OF THE INVENTION

The new surface effect planning pontoon (SEPP) design is two to three times more efficient with less water drag than comparable size and weight cargo vessels, skirted or SES hover craft and planning hull ship designs. The SEPP design lifts the entire vehicle slightly out of the water and air lubricates the flat pontoon bottoms for minimum water drag. The flat bottom pontoons high speed water ski surface reactions stabilize the design with minimal danger of nose digs-in from wave action. Larger than normal rogue waves may force the hinged air containment doors up flush with the cargo decks bottom, plowing the forward pontoon sections. The large area up swept bow center section stops any dig at this point forcing the bow upward. As a rogue wave passes beneath the catamaran the forward and aft air containment doors individually retract and extend containing the lifting air pad. The SEPP designs flat bottom hulls planing reactions provides improved tracking and high speed turning without side sliding like skirted HC or outboard pontoon or skeg dig-in from lateral "G" forces generated during high-speed turns for the SES type HC.

The SEPPS design safely operates at high water speeds in wave heights up to one and one half times its pontoon depth. The SEPPS twin flat bottom surfaces running on the water surface allows the majority of the wave's mass to pass below and between the pontoons. The hovercraft elevated thin pontoons pierces the wave tops with minimal impact for a smoother high speed ride. Each SEPPS pontoons flotation equals the maximum of the gross weight of the vessel providing a 50% dual pontoon depth or draft water line with the hovercraft off. The sealed cargo deck structure provides additional flotation up to double that required for standard marine flotation. The cargo deck is kept well above the pontoon water line with the HC function off, for smooth slow speed catamaran operations.

The SEPPS designs greatly reduced wetted area allows higher efficiencies than any other high speed hovercraft, SES, or planing hull design. The SEPPS design provides a dual function vessel with a slow to normal ship speed catamaran hull with controllable draft function vessel. A slow to normal ship speed catamaran hull with controllable draft for in harbor or beaching operations and a very high speed zero draft cargo ship of unusual efficiency and smoothness of ride. High speed water tests, 70 m.p.h., in waves one and one half times the pontoons' depth provided smooth splash and wake free operations. Neither of the two SEPPS test craft can achieve plane or exceed hump speeds with the hovercraft off. Both the test craft accelerating with the hovercraft on exceed hump speeds at one quarter, thrust power and cruise at two to three times their hump speeds from forty to sixty m.p.h.

The planning pontoon HC design exhibits excellent high speed stability and very low water drag characteristics at all speeds. The SEPPS design provides safe and efficient zero draft operations at speeds two to three faster than the skirted and the typical thin skeg HC designs with the same horse power to weight ratio. The two test craft demonstrate a smoother high speed ride in rough water than any high speed planing hull or large seaplane that the applicant has experienced. The applicant has considerable experience piloting high speed boats and large seaplanes.

The planing pontoon SEPPS hovercraft (HC) design exhibits safer and better turning capabilities at high speeds than either the skirted or SES type HC. Slow speed operations with the HC function off and operating as a catamaran/ pontoon craft, it exhibits these designs more desirable characteristics for smoothness of ride and positive steering, plus a safer and more stable platform for loading at sea with high lateral flotation.

The designs more economical horse power to weight ratios compared to other type hovercraft and planing hull designs at high speeds, 45 kts. and higher, greatly extends the vessels range and reduces fuel costs. The SEPPS design appears capable of safe operation at more than twice the normal speeds of these craft with the same horsepower (HP) to weight ratios. The design also operates with low thrust power at and near hump speeds, accelerating through humps speeds, with less than one quarter thrust power.

The capability to raise and lower the planing pontoons in the water, varying the water depth or draft provides a triple vehicle operational capability. A catamaran type craft, for slow-speed operation in congested harbor areas and/or for very rough sea conditions which preclude high speed operations. SEPPS operations with variable depth/draft pontoons for slow to medium speed operations through shallow water, and unusual capability, with the ability to out run or circumnavigate forecast bad weather conditions.

DESCRIPTION OF DRAWINGS

FIG. 1 overall construction of SEPP design;
FIG. 2 underside of craft;
FIG. 3 side view, cutaway of craft;
FIG. 4 side view showing air containment doors;
FIG. 5 front view showing loading ramp.

DESCRIPTION OF PREFERRED EMBODIMENT

See FIGS. 1 and 2 for the overall design. The design utilizes a straight line, marine structured ship design. A surface effect planing pontoon (SEPPS) ship catamaran design with no compound hull curves. The SEPPS straight line design lends itself to prefabricated short, identically structured, pontoon and deck sections. The sections are then joined to the desired vessel's length greatly reducing construction time and costs. See FIG. 3. The streamlined marine wave piercing pontoon bow sections are also prefabricated before attachment to the assembled cargo deck and pontoon structure.

Two rectangular cross section flat bottom pontoons (1) to have interiors that contain the SEPPS propulsion engines and their fuel tanks (see FIG. 3). The fuel, water, and waste tanks are integrally built into the pontoon bottoms prior to joining the prefabricated sections. The pontoon structures integrated tanks and their heavy fluids greatly strengthen the structure. A fuel management and transfer manifold system is required for tank to tank and pontoon to pontoon fuel transfer allowing center of gravity weight shifting for balance control and most efficient high speed operations.

Figure 6:
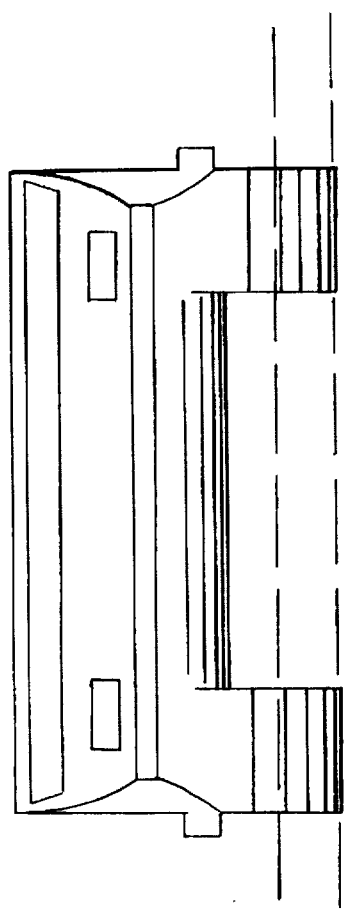
FIG. 6 front view showing water line: off HC and on HC.
Figure 7:
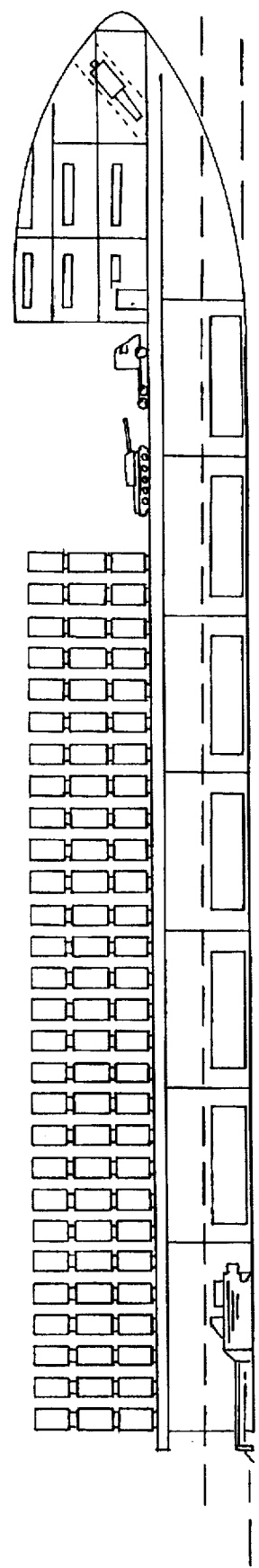
FIG. 7 side view showing water line: off HC and on HC.
Figure 8:
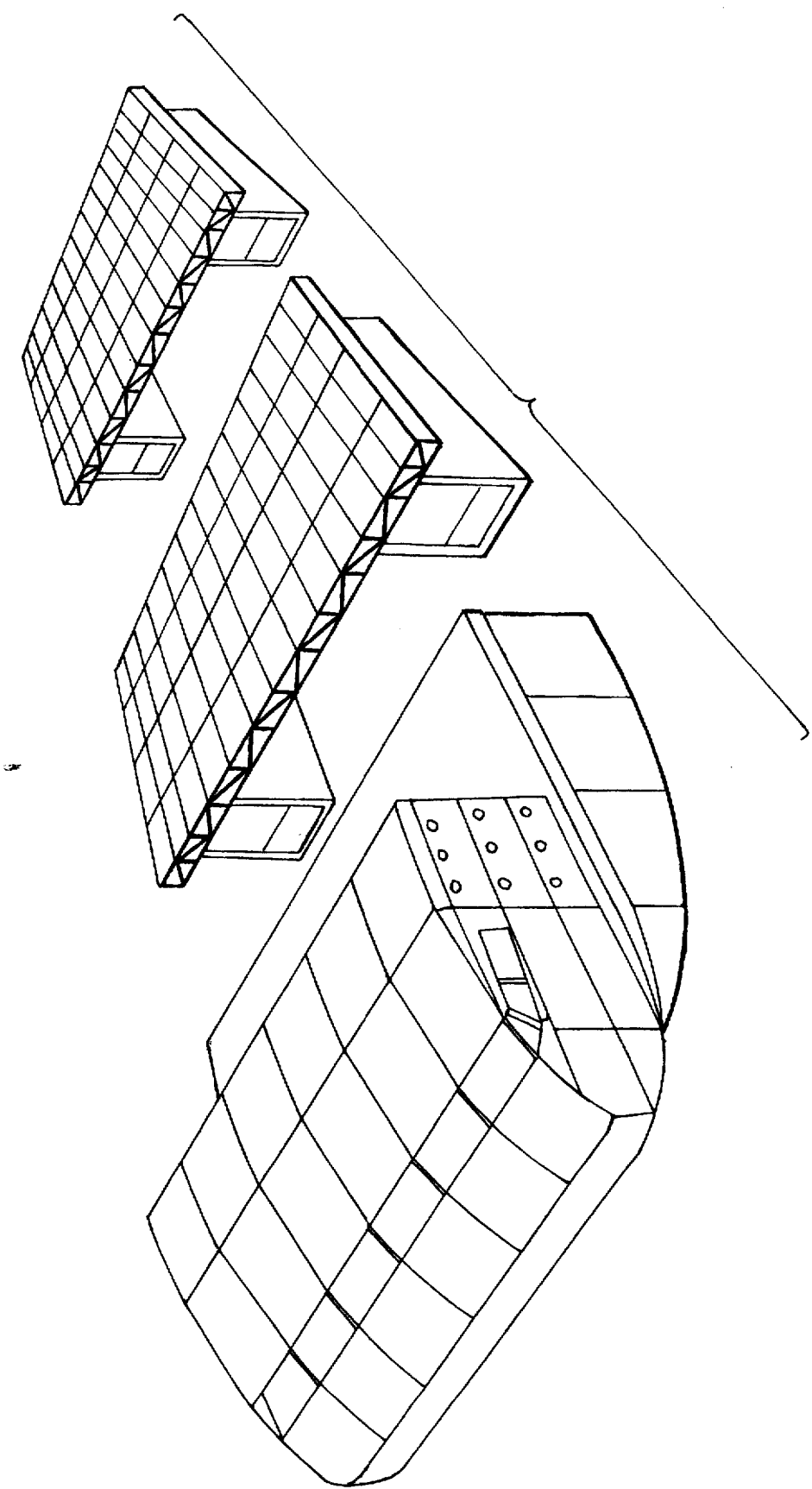
FIG. 8 view of prefabricated sections.
Figure 9:
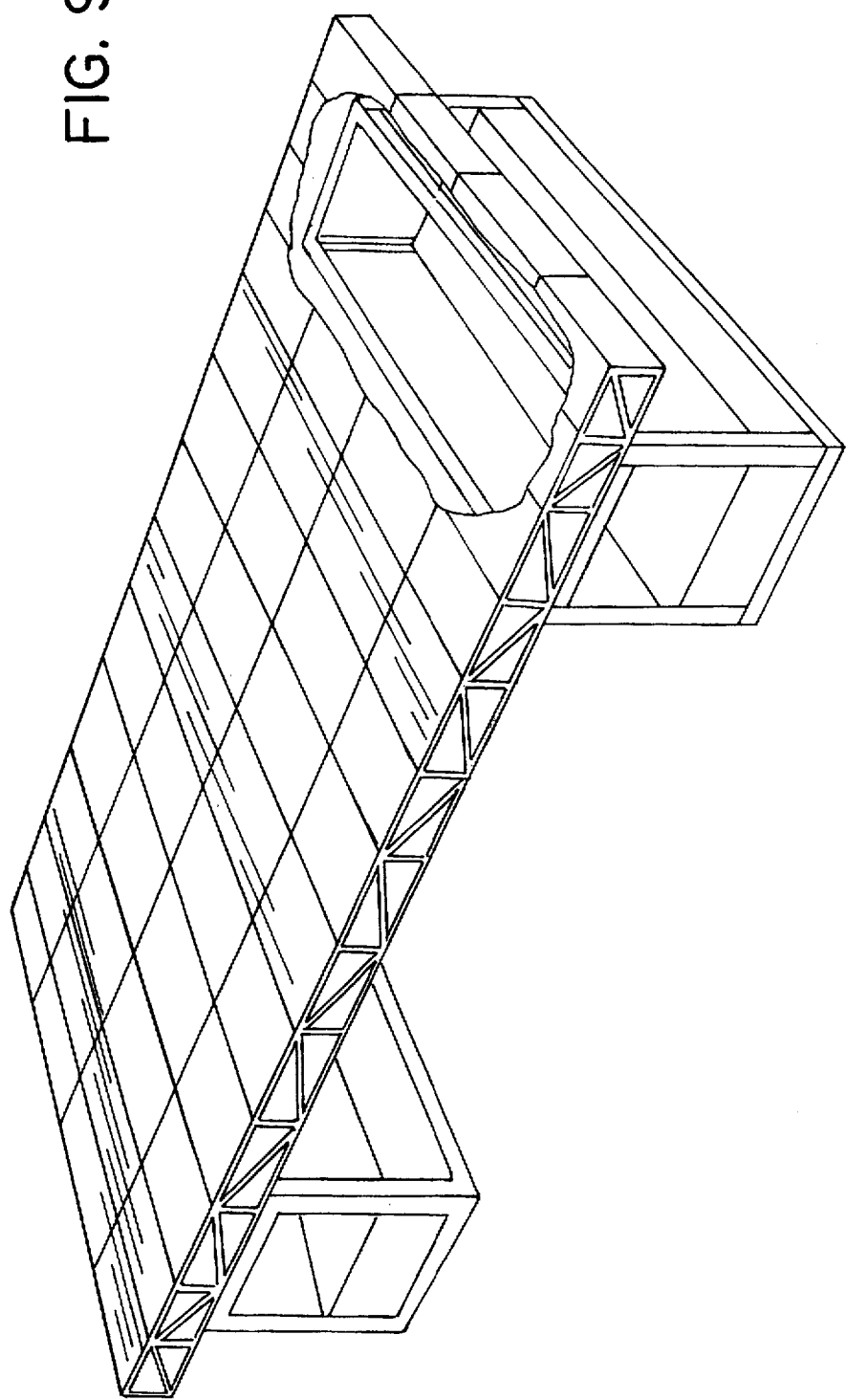
FIG. 9 deck and pontoon section.

The fore and aft clean water tanks may also be used for balance control by transferring their contents. Waste water fluid storage tanks to be installed above the fuel tanks near mid pontoon positions. The thrust engines and their water drive systems are installed in the most aft pontoon sections prior to assembly. Standard marine water bulkheads with access doors are to be installed between the prefabricated pontoon-deck sections. Each SEPPS pontoons flotation equals the maximum of the gross weight of the vessel providing a 50% dual pontoon depth or draft water line with the hovercraft off, see FIG. 6 and 7.

The aerodynamically designed bow section should contain the bridge, crew, and passenger cabins, plus shops and interior storage for cargo handling and tie down equipment (2). FIG. 3 shows the flat rectangular cargo deck (3). The flat structural flotation deck contains cargo movement and tie down fixtures. The sealed cargo deck structure provides additional flotation up to double that required for standard marine flotation.

The retractable ground or beach cargo loading ramp is shown as (4). This provides a roll-on, roll-off loading ramp for cargo transfer to and from beaches.

There should be two doors (5), one at the bow and one at the stern. They should be rectangular and hinged at the top for planing on the surface. These doors, mounted between the twin flat bottom pontoons, will enclose the air pad.

The propulsion engines and water drive systems (6) are mounted in the bottom, stern ends, of each pontoon. Small utility and support craft may use stern-mounted air drive systems.

A hover craft power system is used to mechanically generate a lifting air pad, see FIG. 4. The soft pad is laterally contained beneath the ship by the side mounted flat bottom pontoons and the fore and aft air containment doors. The air containment doors and the power for generating the lifting air pads adds little weight or complexity to the design compared to the high speed water drag and complexity of skirted and ses hovercraft, hydrofoils or optimized high speed planing hull designs. A slow to high speed zero draft ship design encompassing both the ses hovercraft and catamaran low drag operational characteristics. The SEPPS designs can be of any size from 25 ft. recreational craft to over 500 ft. high speed cargo ships. A craft of simplified straight line marine structure provides exceptional economy of operations at very high surface ship speeds. A twin hull catamaran design utilizes a hovercraft air pad to lift vessels to the water surface. The flat bottom planing pontoons high speed reactions on the surface provide the lateral and longitudinal stability required by the soft hovercraft air pad. The hovercraft air pad actually lifts the flat pontoon bottoms slightly out of the water and air lubricates their flat bottom planing surfaces for improved speed efficiencies. The design's very low water drag characteristics allows two to three times higher operational speeds with the same horsepower to weight ratios as conventional cargo vessels. The economy of the design is moving marine cargo two to three times faster while using two to three times less fuel.

The elevated slim, flat bottom, planing pontoons riding slightly above the mean water surface pierce only the wave tops for a smoother ride in most open sea wave conditions than large cargo ships or any wave bashing, planing hull, high speed ship. The high speed prototype test craft operate smoothly at forty to sixty mph in wave heights one to one half times their pontoon's depth. A large SEPPS cargo vessel with forty to fifty ft. deep pontoons could operate at high speed in sixty ft. waves. The faster and more economical SEPPS zero draft designs can open may new shallow water shipping lanes, rivers, and ports to commerce.

I claim:

1. A high speed water craft for transporting large cargo loads upon the surface of bodies of water, said craft comprising: a catamaran design having a pair of flat bottomed narrow pontoons in connection with a sealed rectangular floatation cargo deck so as to form an air containment area between said pontoons, each of said pontoons having a bottom surface, said air containment area having a front containment door and having a rear containment door so as to define a front containment area near said front door and a rear containment area near said rear door, a means for generating an air cushion in connection with said air containment area; said means for generating an air cushion sufficient to raise said bottom surfaces of said pontoons to the surface of said body of water, said craft comprising straight line hull sections for modular assembly, said craft having an aerodynamically shaped bow section comprising a bridge, crew and passenger quarters and having a stern section and having at least two streamlined wave piercing pontoon bow sections, said containment doors of rectangular shape and hinged at the top and slanted aft in order to allow said craft to plane upon the water's surface, said craft having bow and stern inflatable skirts laterally mounted between said pontoons and having fuel and liquid storage tanks mounted inside said flat bottom pontoons, said craft having a drive system for propelling said craft through the water.

2. The watercraft of claim 1 wherein said air containment doors are sloped at an angle sufficient to allow said doors to slide over the water surface with a minimum of resistance to water, said air containment doors capable of retracting when not in use, said forward air containment door capable of being held down by air pressure of said watercraft.

3. The watercraft of claim 2 wherein said bow section is angled upward at about an angle of 30° in order to prevent said bow section from plowing and digging into the surface of the water.

4. The watercraft of claim 3 where drive system includes an engine installed in said bow section above said forward air containment door, said craft having air cushion generation means comprising a fan system capable of forcing air downward beneath said deck and between said pontoons and said front and back air containment doors, said fan system positioned to create an air pad over pressure in said bow section; said over pressure for lifting said bow section slightly higher than said stern section in order to create a positive planing angle for said flat bottom pontoons.

* * * * *